(12) United States Patent
Rife

(10) Patent No.: US 8,561,310 B2
(45) Date of Patent: Oct. 22, 2013

(54) METHOD TO DETERMINE THE LAUNCH ANGLE OF A GOLF PUTTER FACE DURING A PUTTING STROKE

(76) Inventor: Guerin Rife, Carlsbad, CA (US)

( * ) Notice: Subject to any disclaimer, the term of this patent is extended or adjusted under 35 U.S.C. 154(b) by 122 days.

(21) Appl. No.: 13/199,143

(22) Filed: Aug. 22, 2011

(65) Prior Publication Data

US 2013/0047453 A1    Feb. 28, 2013

(51) Int. Cl.
    *G01B 1/00*    (2006.01)
(52) U.S. Cl.
    USPC ............................................................. 33/508
(58) Field of Classification Search
    USPC ..................... 33/508; 473/407, 408
    See application file for complete search history.

(56) References Cited

U.S. PATENT DOCUMENTS

| | | | | |
|---|---|---|---|---|
| 4,468,034 A * | 8/1984 | Duclos | ............................ | 473/242 |
| 5,171,017 A * | 12/1992 | Betancourt | .................... | 473/218 |
| 5,203,453 A * | 4/1993 | Dirito | ......................... | 206/315.3 |
| 5,984,801 A * | 11/1999 | Mason | ............................ | 473/270 |
| 6,758,759 B2 * | 7/2004 | Gobush et al. | ................. | 473/131 |
| 6,779,277 B2 * | 8/2004 | Sones | ............................... | 33/508 |
| 6,799,377 B2 * | 10/2004 | Sones | ............................... | 33/508 |
| 7,621,828 B2 * | 11/2009 | Voges et al. | .................... | 473/409 |
| 2003/0008731 A1 * | 1/2003 | Anderson et al. | ............. | 473/407 |
| 2004/0030527 A1 * | 2/2004 | Rankin | ........................... | 702/153 |
| 2006/0189414 A1 * | 8/2006 | Voges et al. | .................... | 473/407 |
| 2013/0047453 A1 * | 2/2013 | Rife | ................................ | 33/508 |

* cited by examiner

*Primary Examiner* — Yaritza Guadalupe-McCall
(74) *Attorney, Agent, or Firm* — J. J. Aquilino

(57) ABSTRACT

A method of determining the launch angle of a putter by evaluating the roll performance of a golf ball after being struck by a golf putter during the execution a putting stroke. The golf ball is placed on a flat testing platform having a nap upper surface and a putting stroke is made by a golfer causing the golf ball to move forward along said platform. As the ball moves along the nap surface, the ball creates skid and roll marks on the nap surface. These marks are compared against a series of known marks to determine the precise launch angle of the putter face of the golf putter being used to execute the stroke.

6 Claims, 1 Drawing Sheet

METHOD TO DETERMINE THE LAUNCH ANGLE OF A GOLF PUTTER FACE DURING A PUTTING STROKE

BACKGROUND OF THE INVENTION

The present invention relates to a method to determine the roll performance of a golf ball after being struck by a golf putter and in particular to a method to determine the launch angle of the putter face when it strikes a golf ball during the execution of a putting stroke.

In the act of fitting a putter to a given golfer it is desirable to know when the golf ball starts rolling, end over end, allowing it to travel on a true line with minimum deviation from its intended path to the hole. Conventional putter face technology typically incorporates four to six degrees of loft that causes the ball, when impacted by the striking face of a putter, to be lifted slightly as it is being propelled forward. The reason a putter is designed to lift the ball is, in part, due to the fact that the weight of the ball forms a slight depression as it lies on the grass surface during the time the golfer approaches the green and goes through a variety of pre-shot routines, such as green reading, before subsequently striking the putt. It is therefore desirable to lift the ball out of this slight depression as it is being struck to avoid friction with the ground that will negatively affect accuracy of the roll path. This lifting effect is referred to as launch angle.

Too much loft on the face of a putter, or too much launch angle, causes a ball to rotate backward in the air and, in turn, this causes the ball to skip and skid before starting to roll. The non-rolling, skipping and skidding movement of the golf ball creates additional friction with the putting surface that has a negative effect on accuracy. Not enough loft or launch angle on a putter face will drive the ball into the surface causing the ball to bounce and skip uncontrollably with a resulting adverse effect on both distance control and accuracy.

Finding the optimal launch angle is an essential part of fitting a putter to any golfer. However, not every golfer is the same in the way they hold a putter as they address the ball. For example, if a right handed golfer is right eye dominant, that individual will tend to position the hands under their right eye because this stronger eye is telling their brain that the shaft is at 90 degrees and perfectly vertical when in fact the shaft is leaning toward the right eye. By leaning the shaft back to the right, away from the target line, the golfer is adding loft to the putter face. Conversely this same right handed golfer may be left eye dominant and will slightly press their hands forward toward the target under their left eye thereby reducing loft on the putter face.

A standard way to analyze launch angle and the resulting roll of a golf ball after impact with a putter is by the use of high speed film or video. This requires the use of expensive video equipment, special lighting and a play back monitor. The ball must also be marked with a special T shaped indicia to register the rotation of the ball as it moves forward after impact. The process of setting up the ball correctly for the camera, recording the impact and movement of the ball, and rewinding and playing back the ball's performance is time consuming and lacks the spontaneity of instant feedback which is so important in golf.

The prior patent art shows an apparatus similar to the apparatus used in the method defined by the present invention, but which is used in a different manner. U.S. Pat. No. 1,761,039 to Hazeltine is directed to a golf practice device in the form of a putting board having a covering of velour or velvet nap to simulate the closely cropped grass of a putting green. Hazeltine teaches that by brushing the nap surface of the covering, the path of a golf ball will appear after a ball has traveled over the brushed surface.

The Hazeltine patent does not teach or anticipate the need to examine the actual roll performance of a golf ball and the launch angle of the ball as it comes off a putter face but simply what path the ball takes to a target. Eighty years ago when Hazeltine patented his invention, analyzing roll was not important for a number of reasons. At that time the greens were slower and the grass was more course. The putters used in those days had 6 to 8 degrees of loft and hit a low chip to the hole. To simulate these conditions, the patent discloses the use of velour or velvet that would have simulated this surface having "sufficient softness to record the travel of a ball thereover." An example of this would be the track produced by putting ball on a green in the early morning which is covered in dew. The ball's path would easily be defined along its entire journey to the hole. In the same way, Hazeltine does not anticipate using his putting practice apparatus to do anything other than show a golf ball's path. There is no teaching in the Hazeltine patent of using his patented apparatus for the purposes of the present invention.

SUMMARY OF THE INVENTION

The current invention is not concerned with the path of a ball but rather its initial performance coming off the putter face and the precise moment when the ball achieves true roll. This roll performance is then used to determine the launch angle of the putter face, enabling adjustments to be made to either the structure of the putter by altering the face angle, or by adjusting the golfer's alignment or putting stroke.

The method of the present invention incorporates a flat board topped with a directional nap, velvet surface. Specifically, the particular type of velvet used with the present invention shows only the frictional contact a golf ball makes prior to the ball achieving true end over end roll, which is when the ball's forward rotation matches its forward motion. To analyze the particular roll performance of a ball in this way, it is necessary to use a very dense and closely cropped velvet of very high quality. The use of this velvet has a unique characteristic of only showing the frictional performance up to the exact moment when the ball achieves true roll.

As will be discussed below, true roll is defined as the point at which a balls forward rotation matches its forward motion. When true roll is achieved the high quality, dense velvet will no longer display the balls path. For example, in the case of a putter having too much loft, the ball will bounce forward along the board before starting to roll end over end. The velvet will show each point where the ball touched the surface while it was bouncing. As the ball makes contact with the velvet, friction will force the ball to begin rotating forward. This rotation will eventually match the balls forward motion or achieve true roll. As that is about to occur, the velvet will display the actual dimples that are common to the surface of a golf ball defining the exact point at which the ball truly starts to roll. Another example, where the ball is struck with not enough loft on the putter face, the velvet surface will show there is no initial lift of the golf ball leaving an immediate skid mark in the velvet. Adjusting the loft of the putter face by bending the putter's hosel or by the golfer repositioning their hands, allows the golfer to create an optimal launch angle to achieve the desired lift and roll of a golf ball. After each use of the board the velvet can be re-brushed to prepare the surface for another roll test and analysis.

From a marketing perspective, this roll test method is far less expensive and easy for someone not proficient in using high speed video equipment. Many of the putters sold commercially incorporate a variety of face technologies that promise improved roll performance. A sales person in a golf retail environment can simply use the method of the present invention by placing the dense velvet covered board on the floor in a putting area and go through a number of simple steps that allow the customer to compare the roll characteristics of the various different types of putters. This allows a golfer to determine the particular putter that produces optimum roll for his or her putting stroke.

In addition, the method of the present invention can be used anywhere there is a relatively flat support surface to train the golfer to position the hands properly and to make an optimum putting stroke. The apparatus used with the method of the invention is easily portable and can be used indoors or out on a putting green prior to a round of golf. Golfers can instantly see how they roll the ball and train themselves using the putting stoke that produces the desired roll through repetition. The method is also useful to determine the optimum putter and/or putting stroke for different green speeds. For example, extremely fast greens require putters to have less loft, whereas slow greens require putters with more loft. This device allows golfers to choose the correct putter having the correct loft and launch angle to maximize their performance.

Among the objects of the present invention is the provision of a method of determining the roll characteristics of a golf ball struck by a putter type golf club.

Another object of the present invention is the provision of a method to train a golfer to strike a golf ball with a putter to achieve the optimum launch angle a ball should take on a putting surface for increased accuracy of the golf ball roll.

These and other objects of the present invention will be apparent with reference to the following specification and accompanying drawings.

DESCRIPTION OF THE PREFERRED METHODS

Figure 1:
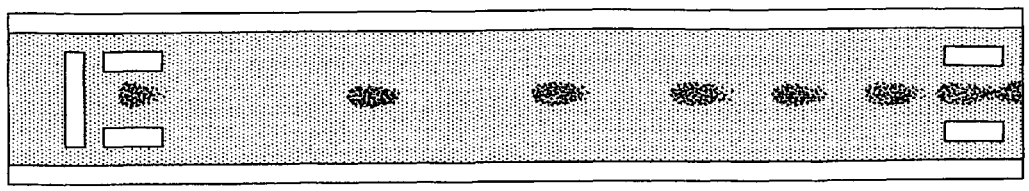
FIGS. 1 to 5 of the drawings show a plan view of a roll board used with the method of the present invention, including views representing most common roll paths of a golf ball created during the practice of the invention.

In the practice of the method of the present invention, it will be appreciated the roll board, shown in plan only in the drawings, is formed of a flat, planar, rectangular sheet of material such as wood, particle board, plastic, or light weight metal such as aluminum. The board is preferably three to four feet long and has a marked starting position where a golf ball is placed prior to being struck by a putter when practicing the method of the present invention. The upper surface is coated or layered with a dense nap material such as velvet. The board has a sufficient width so a golf ball, reasonably struck by a golfer during the execution of the putting stroke, will remain on the surface of the board during the roll path from the starting point and exit the opposite end of the board. As the ball rolls across the velvet surface, it leaves telltale markings as described hereinbelow.

In order to practice the method of the present invention to analyze the roll of a golf ball being struck by a golf putter, it is preferable to first locate a level spot, preferably on a putting green, with a hole or target approximately twenty feet away. With the velvet side up, the roll board is set up on the putting surface so that it aims at the target or hole. Using a foam eraser, the directional velvet nap on the top surface of the board is brushed toward the start position. A golf ball is placed on the start position at the end of the board.

To evaluate the face angle of a particular putter during the putting stroke, a golfer uses the putter to make a stoke sufficient to roll the golf ball to the target along the full length and off the end of the board. This step may be repeated a number of times until a consistent stroke is made and the ball reaches the target each time. Each roll will display a roll pattern on the velvet surface. After each roll the velvet nap is again brushed as described above. The final step is to make a single putting stroke like the ones just practiced. The velvet will reveal how the golf ball rolls with that particular putter if the launch angle is correct.

After the putting stroke has been made, the roll board is read to determine the characteristics of the putter itself and/or the particular way a golfer executed the putting stroke. The roll pattern on the roll board is then compared with each of a series of known roll patterns in order to determine the launch angle of the putter and/or the loft of the putter face as determined by the way the golfer uses the hands to execute a putting stroke. There are five basic roll patterns that determine the loft of the putter face or the launch angle, as it strikes the ball. These roll patterns are illustrated in FIGS. 1 to 5 of the drawings.

FIG. 1 illustrates a first golf ball roll pattern when the golf ball has been struck with too much loft. This strike creates an initial short "v" shaped impression on the start area of the board followed by a series of oval shapes that start 8 to 10 inches down the roll path and repeat getting progressively closer together toward the end of the board. With this pattern, the putter is launching the ball forward with far too much loft and needs to be de-lofted or the golfer needs to press his or her hands forward at address and maintain that shaft angle thru impact with the ball.

Figure 2:
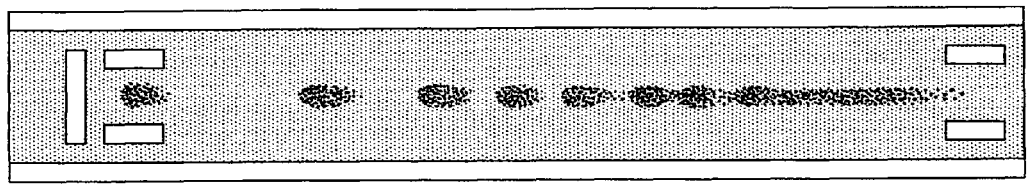

FIG. 2 illustrates a second golf ball roll pattern when the golf ball has been struck with slightly too much loft. This strike creates an initial, longer "V" shape impression followed by an oval shape 6" to 8" then a series of progressively closer ovals, followed by connected "hour glass" shaped ovals, and finally a solid line that ends in the dimple shapes from the surface of the golf ball toward the end of the board. This putter needs a similar adjustment as described above but in a lesser amount. Alternately the golfer's stroke can be adjusted by de-lofting the putter during the execution of the stroke.

Figure 3:
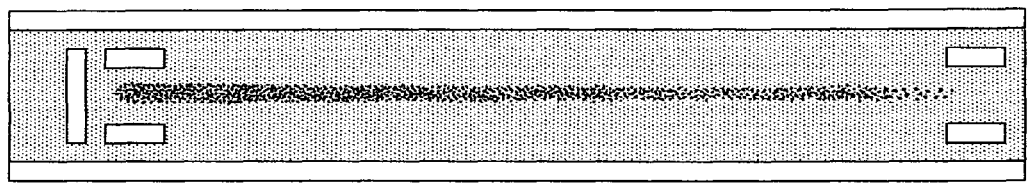

FIG. 3 illustrates a third golf ball roll pattern when the golf ball has been struck with zero loft. This strike creates an initial, constant and elongated shape followed by the dimple impressions from the ball. This requires that loft be added to the putter or the golfer needs to pull the hands back during the stroke.

Figure 4:
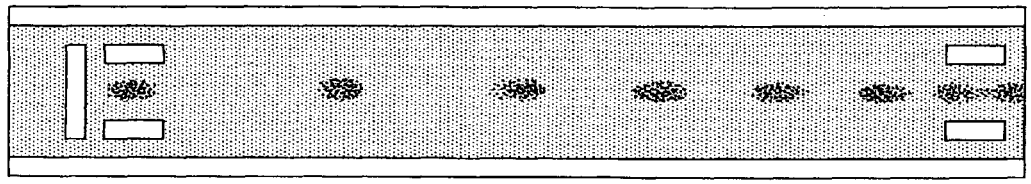

FIG. 4 illustrates a fourth golf ball roll pattern when the golf ball has been struck with negative loft. This stroke creates an initial oval shape followed by additional oval shapes spaced progressively closer until the end of the board is reached. In this case the ball is struck driving it down into the surface causing the ball to bounce forward. This pattern calls for adding loft to the putter or executing a stroke with the hands pulled back at address.

Figure 5:
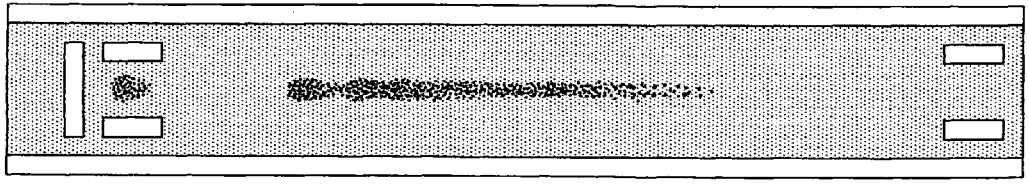

FIG. 5 illustrates a golf ball roll pattern when the golf ball has been struck with perfect loft and corresponding launch angle. This stroke creates a pattern on the board formed of a "v" shaped impression near the impact point, a single oval shape 4 to 6 inches down the roll path line and immediately thereafter followed by a series of connected ovals and subsequent dimple impressions that disappear as the ball continues to roll along the length of the board. When this occurs it becomes apparent that perfect roll has been achieved and the putter is correctly set up with the ideal launch angle for the golfer's individual specifications.

Briefly summarizing the method of the present invention, a flat, planar roll board having a velvet upper surface is placed on a relatively flat surface. A golf ball is placed on one end of the roll board at a position designated as a starting position. To begin the test, a golfer aligns a putter next to the ball and executes a putting stroke causing the ball to travel the length of the board. As the ball moves across the surface of the board, it makes a series of variously shaped marks as it contacts the nap of the velvet; the shapes being determined by the launch angle of the putter face as the ball is struck. Once the stroke is finished, the pattern of shaped marks that was created on the velvet is viewed and compared with a series of known patterns of marks calibrated in terms of the precise launch angle of the putter face as the golf ball is struck during the execution of the putting stroke by the golfer.

It will be appreciated that various adjustments of the putter and/or the putting stroke may be made until a preferred launch angle and resulting pattern is achieved and repeated by the golfer. Also various adjustments may be made should roll patterns result that do not match with the known roll patterns until a match or nearly a match is achieved. It will also be appreciated that the method of the present invention is not limited to the exact roll board shown since various sized, shapes and materials may be used that create the roll patterns described above.

The invention claimed is:

1. A method of determining the launch angle of a putter face when it strikes a golf ball during the execution of a putting stroke by evaluating the roll performance and launch angle of the golf ball comprising the steps of: placing a golf ball on a flat testing location having a nap upper surface; executing a putting stroke against said golf ball causing the ball to move forward along said nap upper surface; said ball creating a series of roll marks on said nap surface as the ball rolls thereover; and, comparing said roll marks against a series of known roll marks to determine the precise launch angle of the putter being used to execute the stroke as the putter strikes the golf ball.

2. The method of claim 1 further including the step of adjusting the launch angle of said putter; repeating the putting stroke after said adjustment; and, comparing the roll marks of the repeated putting stroke against said known roll marks.

3. The method of claim 1 further including the step of adjusting the putting stroke of a golfer to alter the launch angle of said putter; repeating the putting stroke after said adjustment; and, comparing the roll marks of the repeated putting stroke against said known roll marks.

4. The method of claim 1 further including the step of brushing the nap surface in a direction whereby the grain of the nap is against the ball path direction.

5. The method of claim 1 further including repeating the method steps after adjustment of the putter launch angle until a favorable result is achieved.

6. A method of determining the launch angle of a putter face of a golf putter and the roll performance and characteristics of a golf ball struck by said putter face during the execution of a putting stroke comprising the steps of:

placing a golf ball on a flat, roll board having a directional nap on an upper surface thereof;

executing a putting stroke against the golf ball causing the golf ball to move forward along said roll board over said directional nap on said upper surface; creating a series of marks on said directional nap surface by the movement of said golf ball; said marks defining the roll characteristics of said golf ball, said series of marks forming a pattern on said nap surface of said roll board as the ball travels thereover, said pattern representing the launch angle of said putter face and roll characteristics of the ball; and, comparing said pattern of marks against a pattern of previously made, known marks to determine the launch angle of said putter face used to execute the putting stroke as the putter strikes the golf ball.

\* \* \* \* \*